H. K. GROUT.
RULE.
APPLICATION FILED JAN. 29, 1920.
1,387,599.
Patented Aug. 16, 1921.
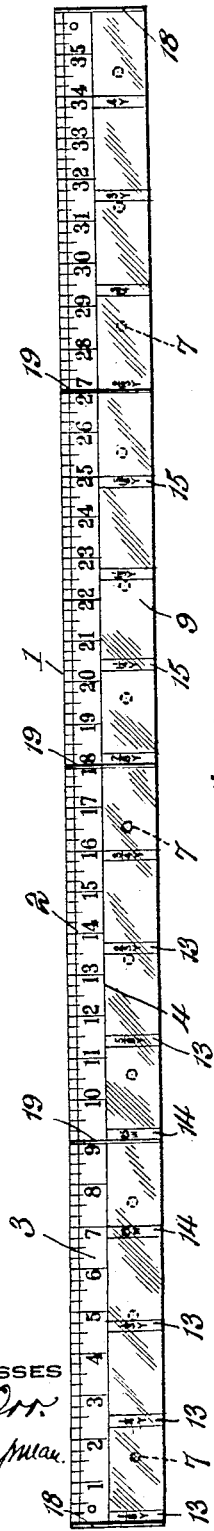
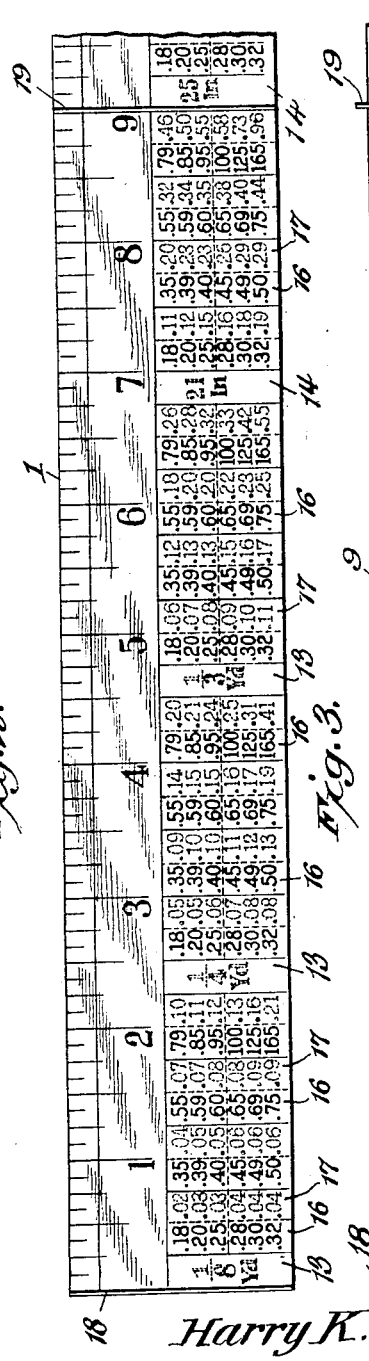
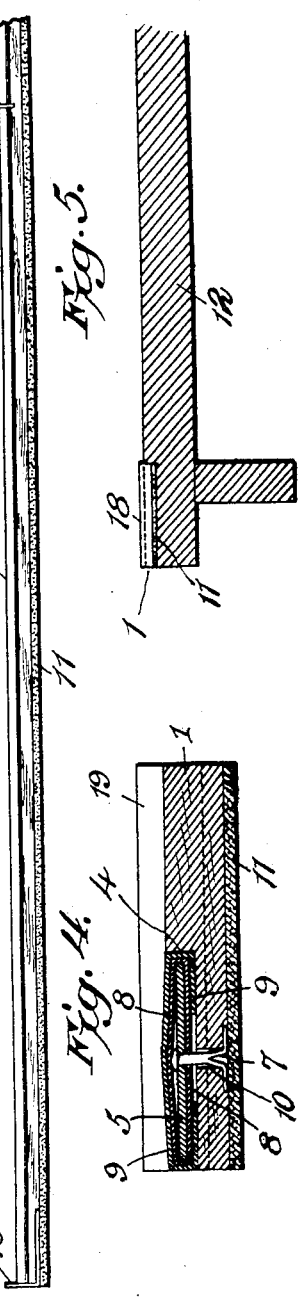
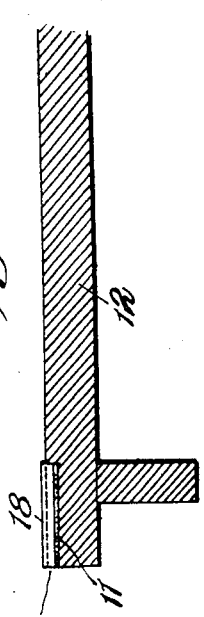
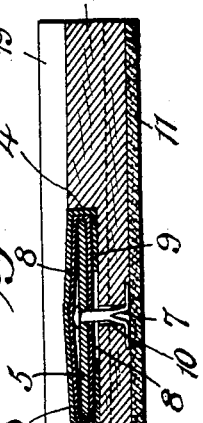
WITNESSES
*Harry K. Grout*, INVENTOR,
BY
ATTORNEY

UNITED STATES PATENT OFFICE.

HARRY KEEPERS GROUT, OF MUSCATINE, IOWA.

RULE.

1,387,599.  Specification of Letters Patent.  Patented Aug. 16, 1921.

Application filed January 29, 1920. Serial No. 354,926.

*To all whom it may concern:*

Be it known that I, HARRY K. GROUT, a citizen of the United States, residing at Muscatine, in the county of Muscatine and State of Iowa, have invented a new and useful Rule, of which the following is a specification.

This invention has reference to rules, and its object is to provide a measuring implement for use in stores where goods are sold by linear measurement, and by whch implement not only may the goods be measured but the price at which the goods so measured is to be sold is designated and consequently may be given to a customer without computation or at a minimum of computation.

The invention comprises a strip or stick of suitable width, length and thickness, and which may be used alone or secured or inlaid into the surface of a counter or table to serve as a practically permanent part of such counter or table. The visible face of the measuring implement is provided with indicia which may be placed adjacent to one long edge, and along the other long edge there is secured a computing scale sunk into the rule and preferably, though not necessarily, about flush with the measuring portion of the rule and protected by a covering of celluloid or similar material permitting a suitably clear view of the indicia.

At the ends and at chosen intervals along the length of the rule are projecting transverse ribs.

The computing scale is arranged in columns transverse of the length of the rule and therefore upright with relation to the manner of using the rule for measuring purposes, the columns being arranged in different series, usually the columns of one series designating lengths, the columns of another series the price per unit of length, and other columns giving the prices represented by the product of the first and second-named columns. For example, if the unit of measurement be the yard, the first series of columns will represent yards and fractions thereof with the fractions those usually employed in sales, say ⅛ yd., ¼ yd., ⅓ yd., etc., and certain lengths in inches or lengths longer than a yard may be included. The prices in such instance will be the various prices charged for commodities in a certain department of a store where the measuring stick is used, and these will appear in the second series of columns, while the third series of columns will contain the prices calculated for the lengths at the designated prices per yard.

The clerk measures off the length desired, which measurement is greatly facilitated by the end and intermediate transverse ribs.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing,

Figure 1 is a face view of the rule constructed in accordance with the invention.

Fig. 2 is a similar view but on a larger scale of the left-hand end of the rule, showing the computing scale in detail.

Fig. 3 is an edge view of that portion of the rule shown in Fig. 2 and on the same scale.

Fig. 4 is a cross section of the rule on an enlarged scale.

Fig. 5 is a section of one edge of a counter or table with the computing and measuring rule inset therein.

Referring to the drawings, there is shown an elongated stick 1 constituting the body of the rule and of suitable length, width and thickness. If it be considered that the stick 1 is a full yard in length, the stick will be made wider than is customary in yard sticks. Along one edge of the stick there are produced indicia 2, which, in the particular showing of the drawings, are the consecutive numbers representing the inch designations of a yard, these being stamped or otherwise produced in a surface 3 of the yard stick closely adjacent to one long edge thereof and extended toward the other edge. Beyond the surface 3 toward the other edge of the stick there is a rabbet or groove 4 having sunken therein a bar or bars 5, either a single bar of substantially the length of the stick, or several bars of a combined length corresponding to that of the stick. In the case of several bars 5 being employed, they are made fast to the stick in the groove 4 by means of rivets 7 or other suitable fastening means used in sufficient number for the purpose. Inclosing the bar or bars 5 is a strip 8 of paper or other suitable material, and inclosing the bar and covering strip 8 is a sheet 9 of suitable material, such as celluloid, through which designations on the sheet 8 may be seen.

The fastening devices 7 may be in the nature of split rivets or may be of any other suitable character, split rivets being advantageous in permitting the assemblage of the parts and the final passing of the rivets 7 through appropriate holes 10 in the bottom of the groove 4.

By a construction similar to that illustrated, the bar or bars 5 are securely fastened to the body of the stick, with the rivets holding the bars, strip 8 and covering 9 firmly in place.

Where the measuring stick is to be employed by itself without being permanently fastened in place, it is provided with a bottom covering 11 which may be of felt or other suitable material to prevent marring by the stick.

In Fig. 5, the stick 1 is shown as embedded in the top of a counter or table 12 so that it becomes a permanent fixture and as such is particularly useful in department stores, where each stick may be individualized to a department containing goods of such character that a stick having a certain price chart will answer for the particular counter without making the stick unduly bulky.

In Figs. 1 and 2, there are indicated certain columns 13 with fractional designations of yards, other columns 14 with inch designations, and still other columns 15, appearing in Fig. 1 only, in which greater lengths than a single yard are indicated. The length designations are, for convenience of identification, shown in some distinctive color or otherwise so as to readily catch the eye. Between the length columns are other columns 16 and 17 in alternation, the columns 16 containing different prices and the columns 17 containing the cost of the yards or parts thereof at the several prices. The measure columns are spaced far enough apart to include between them several pairs of columns 16 and 17, so that the rule as a whole may include in its chart portion a large number of unit prices with the fractional prices associated therewith in position to be readily ascertained by the sales-person without mental effort. By having the numbers in the columns 16 and 17 printed distinctively different there is no danger of confusing unit price numbers with fractional price numbers shown in the columns 13. Each column 13 has but one measure indication, while each column 16 and 17 has several price indications, and several pairs of columns 16 and 17 may be associated with each column 13, thus giving a wide range of usefulness to the rule. For instance, each column 13 has other columns 16 and 17 associated therewith to include, in the particular showing of the drawings, no less than sixty-four unit price columns 16 and cost columns 17 for the sixteen length designating columns 13, so that a large number of prices are designated which would otherwise necessitate calculation with possibilties of mistakes. Of course, other designations than yards may be employed on the chart part of the rule and other prices and numbers of prices may be utilized than those shown, in accordance with the goods to be sold.

At the ends of the rule or stick 1 are angle plates or guides 18 made fast thereto, and projecting above the level of the covering 9 so as to constitute stops, these angle pieces being as long as the width of the rule. At intervals along the rule are other projecting pieces 19 extending crosswise of the rule, all the projecting pieces 18 and 19 being in the nature of ribs slightly protruding above the surface of the rule. In making a sale, the sales-person may lay the goods upon the rule or yard stick against the left-hand end guide 18, thereby eliminating any over-measure which would be necessary if the goods were held between the thumb and finger. The material is readily held in place by pressing down with the left hand on the rule and then the right-hand is brought into position adjacent to the measurement on the rule which it is desired to use. If it be desired to measure off a yard, this may be done by sliding the right hand thumb nail over the surface of the goods until the right-hand guide is reached. Then, by closing the fore-finger on the outer side of the right-hand end guide, the goods may be picked up and the thumb nail will still hold the exact place. This operation will answer for ¼ yd., ½ yd. and ¾ yd. positions, since in the particular showing of the drawings, the stops or ribs 19 occur at these particular places, and the goods may be accurately handled in the same manner for the different measurements. By means of the guides or stop ribs, and by using the thumb and fore-finger nails as pincers, the sales-person can accurately measure a number of yards the same every time, where, with indications not serving as stops, it is almost impossible to measure two yards in succession accurately.

The celluloid covering or envelop 9 is not only transparent, permitting ready view of the chart 8 while protecting it, but is of a character allowing the smooth movement of the hand over the chart while laying out the cloth or other material for measurement.

What is claimed is:—

1. A computing rule comprising a flat elongated stick of a standard length, said stick being provided with transverse ribs or projections on its working face at predetermined locations intermediate its length and at the opposite ends, said stick having its working face provided with measure designations and with a computing chart, and a transparent protective covering for said chart secured upon the stick whereby a smooth surface is presented over which the material to be measured may be laid, the ribs extending above the working face of the stick throughout their length and extending from one edge across to the other.

2. A measuring stick having measure designations and a computing chart associated therewith and provided with a protecting transparent covering for the computing chart set flush with the working surface of the stick to present a smooth surface for the material to be measured, said stick also having transverse projecting ribs serving as stops for determining limits of measurement and permitting grasping of the goods being measured between the thumb nail and forefinger with the stop intermediate thereof.

3. A measuring stick having a working face formed along one long edge with measuring indicia and along the other long edge with a rabbet, and a computing chart lodged in the rabbet and provided with a transparent protecting cover through which the computing chart is visible.

4. A measuring stick having a working face formed along one long edge with measuring indicia and along the other long edge with a rabbet, and a computing chart lodged in the rabbet and provided with a transparent protecting cover through which the computing chart is visible, said measuring stick being provided with transverse ribs at chosen points projecting above the level of the protecting covering to act as guides permitting the location of the material being measured and grasping of the material so located between the thumb nail and forefinger whereby to accurately determine the termination of the measurement.

5. A measuring stick having measuring designations produced along one long side of the stick and formed with a rabbet on the other long side adjacent to the measuring designations, transverse ribs extending from side to side of the measuring stick at chosen intervals and constituting stops, a computing chart seated in the rabbet and extending from rib to rib, and transparent protecting material forming an envelop for the chart and a smooth surface for that part of the measuring stick carrying the chart to facilitate the placing of material to be measured thereon.

In testimony that I claim the foregoing as my own, I have hereto affixed my signature in the presence of two witnesses.

HARRY KEEPERS GROUT.

Witnesses:
  W. R. JAYNE,
  HELEN RAUCH.